Aug. 6, 1929.  E. B. FURRY ET AL  1,723,847
MECHANICAL CONNECTER
Filed June 2, 1927
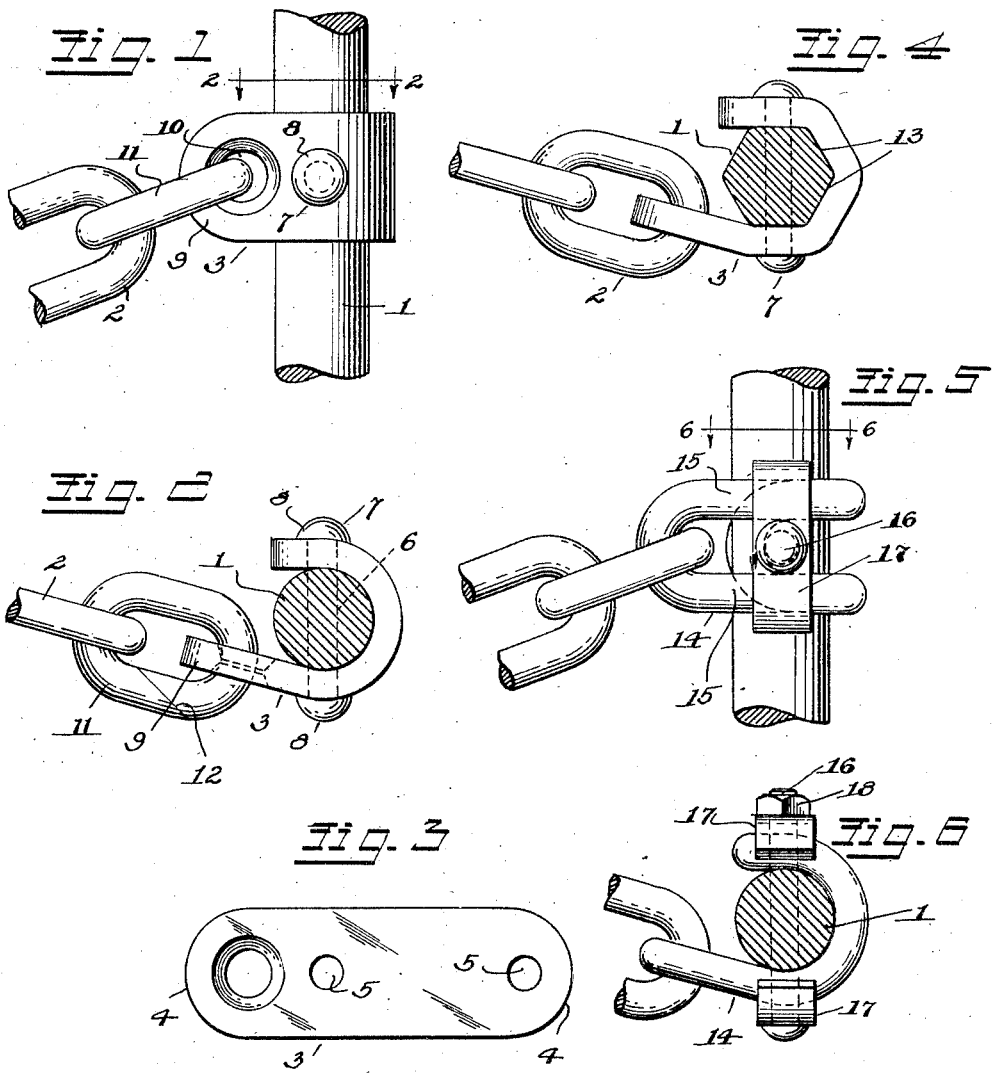
Inventor
Elvin B. Furry
Frank M. Cowgill
By W. S. McDowell.
Attorney Patented Aug. 6, 1929.

1,723,847

UNITED STATES PATENT OFFICE.

ELVIN B. FURRY AND FRANK M. COWGILL, OF COLUMBUS, OHIO.

MECHANICAL CONNECTER.

Application filed June 2, 1927. Serial No. 195,935.

This invention relates to improvements in connecting or anchoring means employed for uniting a flexible element, such as a cable or chain, to a rotatable body, which may be in the form of a shaft, drum or rod, the said connecting means serving for the purpose of permitting of the winding of said flexible element around said body when the latter is rotated. An outstanding object of the invention resides in the provision of a connection of this character which is of strong and durable design, efficient in operation and not apt to break or become out of order when subjected to the strains and stresses of sustained usage and forcible pressures.

The invention is directed more specifically to an improved anchor or connecting means for use in conjunction with the hand operated brake mechanism of railroad cars, and in this specific use of the invention the anchor is employed to permanently and rigidly unite one end of the brake chain with the brake mast or shaft, whereby upon the rotation of the latter the chain may be wound about or unwound from said mast to govern the operation of other cooperating brake structure.

Considerable difficulty has been encountered heretofore in effecting a strong, positive and reliable connection between the brake chain and its operating mast. This has usually been done by means of a bolt or rivet passing transversely through the mast and connected with the end link of the chain. In this construction when the mast is rotated severe shear stresses are imparted to the connecting bolt which frequently shears or breaks and thereby renders the associated brake mechanism entirely inoperative and control of the car is correspondingly lost. Usually, the brake mast is of relatively small diameter and the connecting bolt generally used is of correspondingly restricted size. These factors have entered greatly into the weakness of this conventional type of connection. While these parts are theoretically strong enough to withstand the ordinary stresses and strains of use, yet if there are latent defects present, such as imperfections in the materials used or if unusual strains or pressures are set up, the connection very frequently breaks, particularly the fastening bolt with the result that the control of the associated brake mechanism is thereby lost.

Therefore, in order to improve this construction by making the same stronger and more durable, but without changing the diameter of the operating mast or connecting bolt necessarily, the present invention provides an anchor which consists of a member formed to include a portion shaped to surround, partially at least, the shaft or mast at a position where the brake chain is connected therewith, the portion of said member surrounding the mast being provided with registering openings, arranged to align with a transverse opening provided in the mast, said openings being adapted for the reception of the transverse uniting bolt or rivet, which occupies a fixed position within said opening and serves to retain said member rigid on said mast and to rotate in unison with the latter, said member being provided further with an apertured securing extremity disposed tangentially with respect to the mast, and to which extremity the end link of the associated chain is connected, the construction and mounting of the anchoring member being such as to receive largely the stresses and strains imparted to the connection when the brake mechanism is operated, and to thereby minimize the shear on the connecting bolt or rivet, thus making the connection safer and more efficient in relation to the conventional type of connection.

With these and other objects in view the invention further consists in the novel features of construction, combinations of elements and arrangements of parts hereinafter to be more fully described and pointed out in the appended claim.

In the accompanying drawings:

Figure 1 is a side elevation of a brake mast provided with the improved connection comprising one embodiment of the invention, Figure 2 is a horizontal sectional view taken on the line 2—2 of Figure 1, Figure 3 is a plan view of the anchoring plate or member when the latter is in blank form and prior to being bent for engagement with the mast, Figure 4 is a horizontal sectional view through a slightly modified form of the invention, Figure 5 is a side elevation of a still further modification, Figure 6 is a vertical sectional view taken on the line 6—6 of Figure 5.

Referring more particularly to the specific form of the invention illustrated in Figures 1 to 3 of the drawings, the numeral 1 designates the brake shaft of mast of the type commonly used in connection with the hand operated brake mechanism of railroad cars, particularly freight carrying cars. Adapted to be wound about or unwound from the mast 1 is a flexible element or chain 2 which, also, is of conventional form, size and material. Adapted to connect the chain 2 with the mast 1 so that when the latter is rotated the chain will be engaged therewith, is an anchoring member which is designated in its entirety by the numeral 3.

In the specific form of the invention now being described the anchoring member 3, as shown in Figure 3, is formed from a flat bar or plate of appropriate thickness and width, the opposite ends of the bar being preferably rounded, as indicated at 4. As indicated in Figure 3 this anchoring member is provided with a pair of relatively small openings 5 which are suitably spaced so that when the anchoring member is bent semi-circularly to embrace or engage the shaft, as shown in Figure 2, the said openings 5 will be disposed in alignment with each other and in registration with a transverse opening 6 provided in the mast or shaft 1. Then, to effect the permanent and secure fastening of the anchoring member in its operative position on the mast or shaft, use is made of a transversely extending bolt or rivet 7. The bolt or rivet in this instance is provided with headed ends 8 which serve to enduringly and strongly connect the anchoring member to the shaft.

The anchoring member terminates in a substantially tangentially disposed extremity 9, provided with an opening 10, which is countersunk from both sides of the plate or blank from which the anchoring member is formed. The end link 11 of the chain 2 is received within the opening 10 and this link may be welded along the angular line indicated at 12 in Figure 2, in order that the chain may be permanently held in connection with the anchoring member. By countersinking in opposed directions the walls of the opening 10 the area of contact between said walls and the link 11 is considerably minimized so as to provide for more flexibility in operation and at the same time to relieve the link and the connecting member of excessive wear.

In view of the foregoing it will be seen that by the provision of the connecting member, and the manner of mounting the same on and securing the same to the mast or shaft 1, shear stresses on the bolt or rivet 7 will be reduced to a minimum when the shaft or mast is rotated, the hook or yoke shaped end of the anchoring member serving to absorb the stresses of operation to a large extent and more particularly to distribute such stresses and strains substantially equally throughout all portions of the connection or, in other words, preventing localization of the stresses upon any single part or portion of the connection, thus enabling the connection without corresponding increase in the size or proportion of its parts, to withstand higher pressures and greater loads without fracture or diminution in its operating efficiency.

Another form of the invention has been disclosed in Figure 4, wherein the construction is substantially that above described but in addition the operating mast or shaft is provided at the zone of the connection with polygonal sides or surfaces, as indicated at 13, and these sides or surfaces engage with corresponding surfaces provided upon the hook shaped end of the anchoring member. This form of the invention also serves to alleviate to a large extent the shear stresses on the connecting bolt.

In Figures 5 and 6 of the drawings the anchoring or connecting member 14 disclosed therein is formed to comprise a link or steel wire loop which includes parallel sides 15. This link is bent to embrace the mast or shaft 1, substantially after the construction shown and described in reference to the preceding forms of the invention. The sides 15 of the link are connected by transversely extending apertured plates of U shaped form, which prevent separation on the part of the sides 15 when the connection is in use. A fastening bolt 16 is adapted to pass through registering openings provided in the plate 17 and is equipped with a nut or other device 18 on the lower end thereof for retaining the plate 17 in their operative clamping positions. In this form of the invention also the working stresses set up will be uniformly distributed throughout the connection, so as to render the latter strong, permanent and effective particularly as regards the ordinary bolt type of connection.

It is thought that in view of the above the features of the present invention will be readily understood by those versed in the art, without requiring the addition of further detail description or disclosures of modifications. Such additional modifications all embodying the same principle of bending the connecting member or engaging the connecting member with the brake shaft or mast so as to equalize and minimize the stresses and strains on the transversely disposed connecting bolt or rivet. The invention, therefore, is not to be limited to the precise details of construction as above set forth, but may include generally all such modifications that may be said to fall within the scope of the following claim.

What is claimed is:

In mechanism of the character described, the combination with a shaft, of an anchoring member formed at one end to partially surround and closely engage said shaft, the other end of said anchoring member disposed tangentially with the circumference of said shaft, a fastening element passing transversely through said shaft and having both of its ends engaged with said anchoring member, and a chain connected with said tangentially disposed end of said anchoring member.

In testimony whereof we affix our signatures.

ELVIN B. FURRY.
FRANK M. COWGILL.